Jan. 9, 1923.
D. S. JACOBUS.
METHOD OF OPERATING POWER PLANT SYSTEMS.
FILED JULY 10, 1918.
1,441,507.
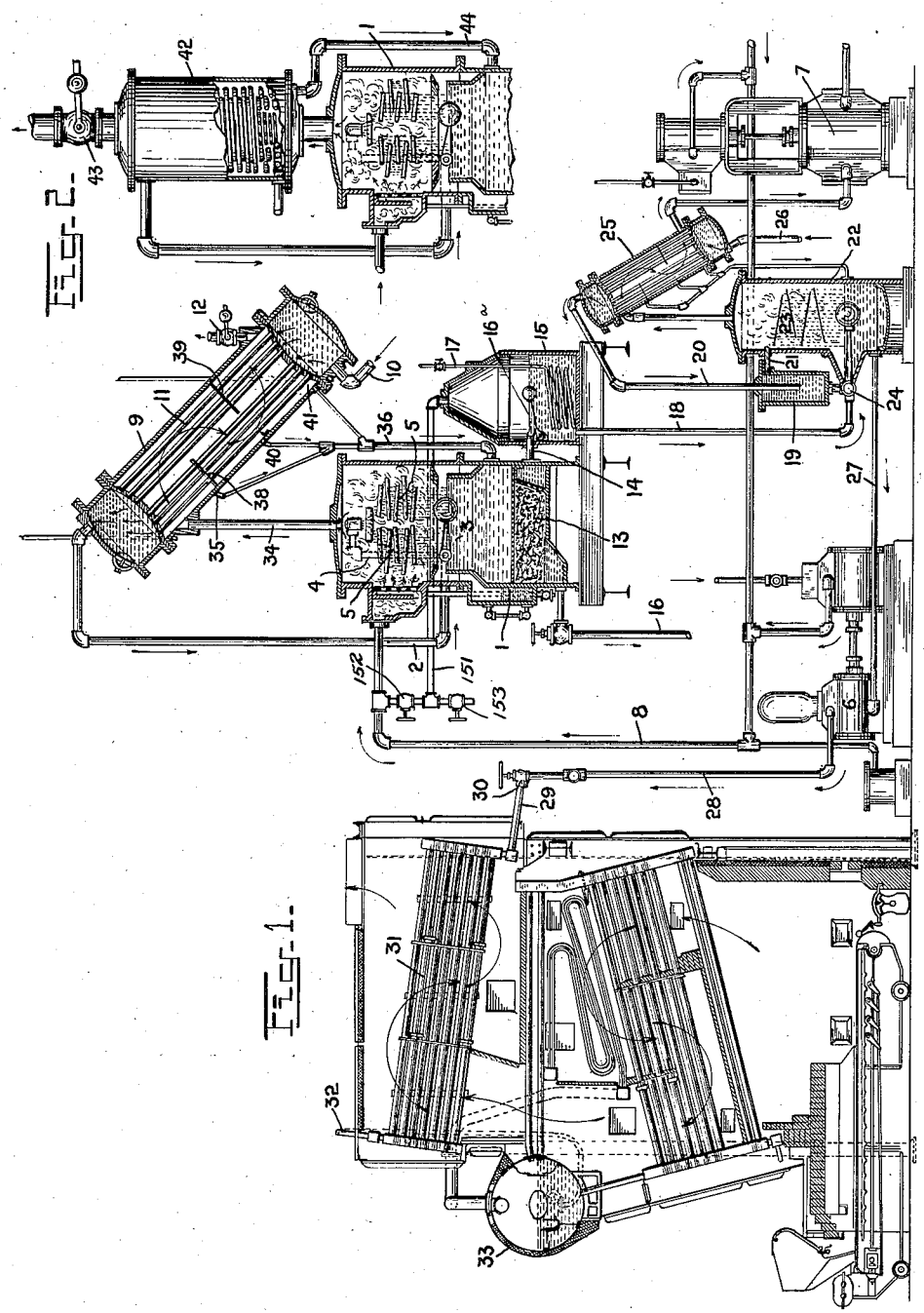
INVENTOR.
David S. Jacobus
BY
his ATTORNEYS.

Patented Jan. 9, 1923.

1,441,507

UNITED STATES PATENT OFFICE.

DAVID S. JACOBUS, OF JERSEY CITY, NEW JERSEY, ASSIGNOR TO THE BABCOCK & WILCOX COMPANY, OF BAYONNE, NEW JERSEY, A CORPORATION OF NEW JERSEY.

METHOD OF OPERATING POWER-PLANT SYSTEMS.

Application filed July 10, 1918. Serial No. 244,229.

*To all whom it may concern:*

Be it known that I, DAVID S. JACOBUS, a citizen of the United States, residing at Jersey City, in the county of Hudson and State of New Jersey, have invented a new and useful Improvement in Methods of Operating Power-Plant Systems, of which the following is a full, clear, and exact description, reference being had to the accompanying drawing, forming part of this specification.

In power plant practice it is highly desirable that the amount of air or other contained gases in the water fed to a boiler or fed to an economizer and thence into a boiler, be reduced to a minimum, as the presence of air or gases in the feed water is a well recognized source of corrosion. Furthermore, the presence of air or gases in the steam generated by the boiler is objectionable in boiler plants fitted with condensers, as the air or gases reduce the vacuum which in turn decreases the efficiency of the main power generating units. Again, the air and gases must be removed at the low vacuum pressure which exists in the condensers, and an excessive amount of air and gases in the steam leads to an excessive amount of power required to drive the dry vacuum pump, which is employed to remove the air and gases. The majority of the steam power plants operate on what is practically a closed cycle for that part of the steam which is returned to the boilers in the form of feed water; that is, the steam, or the water condensed from the steam, either does not come in contact with the atmosphere, or is in contact to such a limited extent that there is little opportunity of absorbing air and gases in that portion of the water which is re-circulated through the system.

There is always, however, a certain amount of leakage of steam and water from the system and also losses occasioned through the blowing down of the boilers; so that it is necessary to add a certain amount of water from an outside source to compensate for leakage and waste. The water which is so added is called make-up water, and it usually contains a larger amount of air and gases than the water which is circulated continuously through the system.

In my invention this make-up water is treated separately before entering the system and is preferably brought up to the boiling point to expel the air and gases before this make-up water is mixed with the remaining part of the feed water. Novel means are also employed for cooling the air and vapors expelled in heating the make-up water, and also for separating the vapor therefrom. The method of causing the water to boil so as to expel air and gas from the same, and of cooling the air and gases expelled therefrom so as to separate the vapor which is carried along with the air and gases, is also applied to the mingled make-up water and that part of the water which is re-circulated through the system.

In my present arrangement preferably the make-up water is first heated in an open tank by which the major portion of the air and gases may be driven off and then this heated water is caused to boil in a closed vessel and under the necessary partial vacuum. When this arrangement is used there is a more thorough elimination of the air and gases and less work is required to be done by the vacuum pump.

My invention is intended to reduce or overcome these objections by operating the power plant in such a manner as to heat the make-up water and remove the air and gases therefrom before it is added to the main supply of feed water; the mingling of such heated water with the feed water being preferably carried out in a vessel closed to the atmosphere and preferably in connection with the exposure of the mingled water to a reduced pressure to further aid in eliminating any air or gas.

The invention will be understood from the following description taken in connection with the accompanying drawing in which Figure 1 is a diagrammatic sectional side elevation of a power plant arranged to carry out my method, and Fig. 2 is a detail view showing a modification of a portion of the apparatus.

In the drawing, 1 is a tank into which the make-up water is introduced through the pipe 2, the level of water being controlled therein by a float valve 3 of any well known construction. The make-up water is discharged from the pipe 2 into the upper part of the tank through the connection 4 and thence flows down over a series of perforated shelves 5, through an atmosphere of steam by which it is heated preferably to 212° F., or to a higher temperature. The steam used for this purpose is preferably exhaust steam from the auxiliaries, such as the feed pump 6, vacuum pump, and from other auxiliaries, not shown. The steam from the auxiliaries enters the tank 1 through the pipe 8.

Connected to the upper part of the steam space of the tank 1 is a combined cooler and condenser which serves to separate from the steam the air and gases thrown off from the water in the tank 1. This is accomplished by cooling the steam and contained gases by means of the make-up water before it enters the tank 1, this make-up water entering the combined cooler and condenser 9 through the pipe 10 and then passing through the tubes 11 into the upper chamber of the apparatus, and thence entering the pipe 2.

As the make-up water entering through the pipe 10 is cooler than the steam in the tank 1, it will act to condense the steam and thereby separate the steam entering this part of the apparatus from the air and gases.

I have shown this apparatus as provided with a relief valve 12 which will act to release the air and gases at certain intervals and prevent an excessive pressure. If desired the relief valve may be dispensed with and the combined cooler and condenser may be vented directly to the atmosphere, or if a relief valve is installed the apparatus may be vented directly to the atmosphere by clamping the relief valve in open position. The heating of the make-up water will aid in expelling the air or gases therefrom and such air or gases as are driven off in the tank 1 will escape through the relief valve 12 or through the vent, if such is used.

I have shown the lower part of the tank 1 as provided with a filter 13 from which the heated water is delivered through the pipe 14 into a tank 15. The tank 1 is also provided with a pipe 16 below the filter and through which any mud or sediment in the make-up water, collected in the filter, may be discharged. The tank 15 is open to the atmosphere, the water being shown as maintained at a certain level therein by means of the float valve 16$^a$. In it the heated water is re-boiled to further eliminate air and gases, this being accomplished by live steam admitted through the valved pipe connection 17. The heat in the vapor which escapes from the tank 15 may be returned to the system by passing the vapor to the tank 1 along with the steam which enters through the pipe 8, or, as it is of relatively small amount, it may be allowed to escape to the atmosphere. To accomplish this, I may provide a pipe 151 connecting tank 15 with pipe 8 and controlled by valve 152, a branch of pipe 151 being open to the atmosphere and having a valve 153. By opening valve 152 and closing valve 153, the vapor from tank 15 passes into tanks 1 with the steam coming through pipe 8. By opening valve 153 and closing valve 152, the vapor passes to the atmosphere.

From the tank 15 the re-boiled water flows through the pipe 18 to the tank 19, which is preferably closed to the atmosphere. In this closed tank the heated make-up water is mingled with the main supply of feed water which enters through the pipe 20.

The mingled water from the tank 19 is delivered through the pipe 21 to the upper part of the tank 22, having a series of perforated shelves 23 over which the water flows downwardly. Through the reduction of pressure in this tank 22 the water is made to boil again and thus give off a further amount of air and gas. A float-controlled valve 24 in the pipe 18 governs the amount of make-up water admitted to the tank 22. I maintain a reduced pressure sufficient to cause the water to boil in this tank by means of the vacuum pump 7 which is connected to the tank by the combined cooler and condenser 25. The cooling water for the combined condenser and cooler 25 is the main supply of feed water and this enters the cooler through the pipe 26, passes upwardly through the tubes to the upper chamber and leaves the cooler through the pipe 20. The function of this condenser and cooler is the same as that of the condenser and cooler 9 in serving to separate the air and gases from the steam. The feed water passes from the tank 22 through the pipe 27 and is pumped by the feed pump 6 into the main 28, from which it enters a branch connection 29, passing through the valve 30 into the economizer 31, and thence through the pipe 32 to the steam and water drum 33.

The boiler shown is of the Babcock & Wilcox type, comprising a bank of horizontally inclined generating tubes expanded into upper and lower headers and is of well known construction.

It will be noted that the combined condensers and coolers 9 and 25 are arranged on the counterflow principle; that is, the hottest air and gases mingled with the entering steam contact with the hottest ends of the cooling tubes and the coolest air and gases contact with the coolest ends of the cooling tubes. Again, the air and gases which are separated from the steam are made to collect and are discharged at the lowermost part of the apparatus, this being of advantage in a cooler in which it is possible to diminish the temperature of the air and gases below the steam temperature on account of the air and gases being of a greater density than the steam and will naturally flow toward the lowermost part of the apparatus. The air and gases are heavier than the steam even at the same temperature, but when the temperature is reduced below that of the steam, the difference in density is increased, thereby increasing the tendency of the air and gases to flow downward. This aids in avoiding blowing off steam through the air vent. By using this gravity separating principle, much less steam will pass off with the air and gases than otherwise would occur if the air was admitted from the top of the apparatus, with corresponding advantages.

Now, referring more in detail to the structure of the combined condenser and cooler 9, the steam, air and gases enter from the steam space of the tank 1 through the pipe 34 and contact with the upper ends of the tubes 11. They then circulate downwardly back and forth across the tubes by reason of the baffles 38 and 39. The water formed by the condensing steam collects in pockets 35, 40 and 41 and flows down through the drip pipe 36 into the tank 1, entering below its water line.

The air and gases, and any small amount of moisture or steam which they may contain, pass off through the relief valve 12 which will open from time to time to relieve any back pressure. This valve may be, if desired, clamped in open position so as to act as a vent. The combined condenser and cooler 25 is arranged and piped on the same principle as the one just described.

Other forms of combined condensers and coolers may be used instead of the form shown in Figure 1. Thus in Figure 2, I show at 42 a combined cooler and condenser similar to a well known form with a closed feed water heater placed directly over the tank 1. This view is included to show another form of means for cooling the noncondensible gases which are allowed to escape through the relief valve 43, which may be set to open at intervals, or which may be clamped open to serve as a continuous vent. The steam which is condensed in the tank 42 is returned from the tank 42 to the tank 1 through the pipe 44.

From the foregoing description, it will be seen that the make-up water is treated separately for the removal of air and gases in the tank 1 and in the re-boiling tank 15 before it is added to the main supply of feed water; and that I also prefer to extract any further contained air or gases from the feed water after such treatment by boiling it in the tank 15. In order to more thoroughly eliminate the air from the feed water, the boiler or steam engine, or turbine plant is preferably operated in as nearly a closed cycle as possible, that is, without allowing the feed water to come in contact with the atmosphere. It will also be seen that by heating the make-up water in the tank 1, a considerable portion of the air and gases will be driven off through the pipe 34 and will finally pass out of the system through the valve 12. Consequently, the water which passes to the tanks 15, 19 and 22 will be largely freed from air so that the vacuum pump 7, working in connection with tank 22, will have much less duty to perform and will require an expenditure of much less energy than if there had been no such preliminary removal of air from the make-up water.

If desired, the tank 25 may be dispensed with and the water pumped directly from the mingling tank 19 to the economizer or to the boiler. The combined condenser and cooler may be used in connection with other tanks for the removal of air from the feed water, such, for example, as in my United States Patents Nos. 1,219,320 and 1,219,321, granted March 13, 1917, for steam boiler economizer.

Many other changes may be made in the form and arrangement of the apparatus and the various parts thereof, without departing from my invention.

What I claim and desire to secure by Letters Patent of the United States is:—

1. The method of treating feed water in a boiler plant comprising condensing the steam from the boiler to form the main supply of feed water, heating the make-up water to release air and gases therefrom, extracting the contained vapor from the air and gases, returning the heat of condensation in the contained vapor to the make-up water and mingling the heated and treated make-up water with the said condensate and feeding the same to a boiler; substantially as described.

2. The method of treating feed water in a boiler plant comprising condensing the steam from the boiler to form the main supply of feed water, heating the make-up water to release air and gases therefrom, passing the water to a tank and boiling the make-up water therein, mingling the heated make-up water with the said condensate and feeding the same to a boiler; substantially as described.

3. The method of treating feed water in a boiler plant comprising condensing the steam from the boiler to form the main supply of feed water, mingling the make-up water with the said condensate, exposing the mingled water to an atmosphere which will cause it to release air and gases mingled with vapor, cooling the air and gases so released to separate the vapor therefrom, returning heat in the vapor to the feed water, and feeding the mingled water to a boiler; substantially as described.

4. The method of treating feed water in a boiler plant comprising condensing the steam from the boiler to form the main supply of feed water, exposing make-up water to an atmosphere which will cause it to release air and gases, mingling the make-up water with the said condensate, again exposing the mingled water to an atmosphere which will cause it to release air and gases, and feeding the mingled water to a boiler; substantially as described.

5. The method of treating feed water in a boiler plant comprising condensing the steam from the boiler to form the main supply of feed water, heating a portion of the feed water in an enclosed atmosphere to expel air and gases therefrom, then mingling the heated portion of said feed water with the said condensate, and feeding the same to a boiler; substantially as described.

6. The method of treating feed water in a boiler plant comprising condensing the steam from the boiler to form the main supply of feed water, heating a portion of the feed water in an enclosed atmosphere to expel air and gases therefrom, then mingling the heated portion of said feed water with the said condensate, and feeding the same to a boiler while maintaining the heated feed water out of contact with the atmosphere; substantially as described.

7. The method of treating feed water in a boiler plant comprising heating a portion of the feed water in an enclosed atmosphere, allowing the air and gases to escape therefrom, then mingling the heated portion of the feed water with the remaining portion of the feed water in an enclosed atmosphere, and feeding the same to the boiler; substantially as described.

8. The method of treating feed water in a boiler plant comprising heating a portion of the feed water, allowing air and gases to escape therefrom, mingling said heated portion of the feed water with the main supply of feed water, and exposing the mingled volume of the feed water to a reduced pressure to further eliminate air and gases; substantially as described.

9. The method of treating feed water in a boiler plant comprising heating a portion of the feed water in an enclosed atmosphere, allowing air and gases to escape therefrom, mingling the said heated portion of the feed water with the main supply of feed water in a vessel closed to the atmosphere, and then exposing the mingled volume of water to reduced pressure to further eliminate air and gases; substantially as described.

10. The method of treating feed water in a boiler plant comprising heating a portion of the feed water, then passing the feed water into an enclosed atmosphere, allowing air or gases to escape therefrom, and then mingling said heated portion of the feed water with the remaining supply of the feed water; substantially as described.

11. The method of treating feed water in a boiler plant comprising heating a portion of the feed water in an enclosed atmosphere to generate steam and expel air and gases, preheating the feed water by means of the steam generated in said atmosphere, and then mingling the heated portion of the feed water with the remaining supply of feed water; substantially as described.

12. The method of treating feed water in a boiler plant comprising heating one portion of the feed water in an enclosed atmosphere to expel air and gases therefrom, preheating the remaining portion of the feed water, mingling the two portions, and then feeding the same to the boiler; substantially as described.

13. The method of treating feed water in a boiler plant comprising heating a portion of the feed water in an enclosed atmosphere, allowing air and gases to escape therefrom, together with steam, utilizing the steam, air and gases to preheat the feed water passing to said enclosed atmosphere, mingling this heated portion of the feed water with the remaining supply of feed water, and feeding the same to the boiler; substantially as described.

14. The method of treating feed water in a boiler plant comprising heating the feed water and removing a portion of the contained air and gases therefrom, conducting the heated water to a closed vessel having an atmosphere sufficiently reduced to cause the heated water to boil therein, cooling the vapor and gases from said vessel, returning the heat in said vapor and gases to the feed water, and feeding the water to the boiler system.

15. The method of treating feed water in a boiler plant comprising heating the feed water in a first vessel and removing a portion of the contained air and gases therefrom, conducting the heated water to a second vessel, boiling the water in said second vessel, cooling the vapor and gases from both of said vessels, returning the heat in said vapor and gases thus cooled to the feed water, and feeding the water to the boiler system.

16. The method of treating feed water in a boiler plant comprising heating the feed water and removing a portion of the contained air and gases therefrom, conducting the heated water to a closed vessel having an atmosphere sufficiently reduced to cause the heated water to boil therein, condensing the vapor from said vessel to assist in maintaining the reduced pressure in said closed vessel, and feeding the water to the boiler system.

17. The method of treating feed water in a boiler plant comprising heating the feed water and removing a portion of the contained air and gases therefrom, conducting the heated water to a closed vessel having an atmosphere sufficiently reduced to cause the heated water to boil therein, condensing the vapor from said vessel to assist in maintaining the reduced pressure in said closed vessel, returning the heat from such condensation to the feed water, and feeding the water to the boiler system.

18. The method of treating feed water in a boiler plant comprising heating the feed water and removing a portion of the contained air and gases therefrom, conducting the heated water to a closed vessel having an atmosphere sufficiently reduced to cause the heated water to boil therein, finely dividing the water in said vessel to subject all portions of it to said reduced atmosphere, and feeding the water to the boiler system.

19. The method of treating feed water in a boiler plant comprising heating the feed water and removing a portion of the contained air and gases therefrom, conducting the heated water to a closed vessel having an atmosphere sufficiently reduced to cause the heated water to boil therein, finely dividing the water in said vessel to subject all portions of it to said reduced atmosphere, cooling the vapor and gases from said vessel, returning the heat in said vapor and gases to the feed water, and feeding the water to the boiler system.

20. The method of treating feed water in a boiler plant comprising heating the feed water to remove a portion of the contained air and gases, boiling the water thereafter in a closed vessel by live steam introduced beneath the surface of the water in said vessel, and removing from the vessel the vapor produced by such boiling together with any air and gases released thereby, transferring the heat in the vapor back to the water at the point where it is being heated and feeding the water to the boiler.

21. The method of treating feed water in a boiler plant comprising heating the water in a closed vessel by direct contact with steam and removing from the vessel the vapor produced by the heating together with the air and gases released by the heating, separating the air and gases by condensing the vapor, permitting the air and gases to pass to the atmosphere, and transferring the heat of the vapor to the water passing to the closed vessel.

22. The method of treating feed water in a boiler plant comprising heating the water in a closed vessel by direct contact with steam and removing from the vessel the vapor produced by the heating together with the air and gases released by the heating and passing the vapor, air and gases into a condenser, condensing the vapor by water passing to the closed vessel to transfer the heat of the vapor to such water and to free the air and gases from vapor, and permitting the air and gases to pass intermittently to the atmosphere.

In testimony whereof I have hereunto signed my name in the presence of two subscribing witnesses.

DAVID S. JACOBUS.

Witnesses:
 EDITH CAMB,
 JOHN A. W. DIXON.